United States Patent [19]

Takeuchi et al.

[11] Patent Number: 5,453,592
[45] Date of Patent: Sep. 26, 1995

[54] ELECTRICAL DISCHARGE MACHINING APPARATUS AND METHOD

[75] Inventors: Hiroshi Takeuchi; Yoshiro Nakayama, both of Nagoya, Japan

[73] Assignee: Mitsubishi Denshi Kabushiki Kaisha, Tokyo, Japan

[21] Appl. No.: 911,553

[22] Filed: Jul. 9, 1992

[30] Foreign Application Priority Data

Jul. 12, 1991 [JP] Japan .................................. 3-172449
Jul. 15, 1991 [JP] Japan .................................. 3-173840

[51] Int. Cl.⁶ .............................. B23H 1/02; B23H 7/04; B23H 7/20
[52] U.S. Cl. ............................. 219/69.17; 219/69.12; 219/69.13
[58] Field of Search ........................ 219/69.12, 69.13, 219/69.17, 69.16; 364/474.04

[56] References Cited

U.S. PATENT DOCUMENTS

| | | | |
|---|---|---|---|
| 4,559,434 | 12/1985 | Kinoshita | 219/69.17 |
| 4,970,363 | 11/1990 | Obara | 219/69.12 |
| 4,980,532 | 12/1990 | Morishita | 219/69.13 |
| 5,200,905 | 4/1993 | Uemoto et al. | 364/474.04 |
| 5,216,218 | 6/1993 | Sasaki | 219/69.13 |
| 5,267,141 | 11/1993 | Morita et al. | 219/69.13 |

FOREIGN PATENT DOCUMENTS

| | | |
|---|---|---|
| 0446368 | 9/1991 | European Pat. Off. . |
| 0491958 | 7/1992 | European Pat. Off. . |
| 4138092 | 11/1990 | Germany . |
| 4222779 | 7/1992 | Germany . |
| 58-171217 | 10/1983 | Japan . |
| 59-227322 | 12/1984 | Japan . |
| 61-30334 | 2/1986 | Japan .................. 219/69.13 |
| 61-56829 | 3/1986 | Japan .................. 219/69.13 |
| 2-53526 | 2/1990 | Japan . |
| 2303719 | 12/1990 | Japan . |
| 9104821 | 4/1991 | WIPO .................. 219/69.13 |

OTHER PUBLICATIONS

English Translation of 42 227 79.

Primary Examiner—Geoffrey S. Evans
Attorney, Agent, or Firm—Sughrue, Mion, Zinn, Macpeak & Seas; Richard C. Turner

[57] ABSTRACT

In an electrical discharge machining apparatus, by adjusting a machining condition changing switch, machining condition changing programs are called from a memory, the machining conditions called from a machining condition group and temporarily memorized in the memory are changed according to the programs, and machining is carried out by machining means according to the machining conditions changed.

9 Claims, 21 Drawing Sheets optimum condition

| | |
|---|---|
| voltage selection Vo | 80V |
| power setting Ip | 300A |
| off time OFF | 8~9μsec |
| wire feeding speed WS | 10m/min |
| wire tension WT | 1200g |
| dielectric fluid flow LQ | 5ℓ/min |
| dielectric fluid resistivity LR | 1×10⁴Ωcm |
| average machining voltage VC | 40~44V |

| | |
|---|---|
| voltage selection Vo | 80V |
| power setting Ip | 150A |
| off time OFF | 30μsec |
| wire feeding speed WS | 8m/sec |
| wire tension WT | 1000g |
| dielectric fluid flow LQ | 5L/min |
| dielectric fluid resistivity LR | $1 \times 10^4 \Omega cm$ |
| average machining voltage VC | 50V | start of machining

| voltage selection Vo | 80V |
| --- | --- |
| power setting Ip | 270A |
| off time OFF | 8~9μsec |
| wire feeding speed WS | 10m/min |
| wire tension WT | 1200g |
| dielectric fluid flow LQ | 5ℓ/min |
| dielectric fluid resistivity LR | 1×10⁴Ωcm |
| average machining voltage VC | 45~49V | stepped workpiece machining 1

| | |
|---|---|
| voltage selection Vo | 80V |
| power setting Ip | 210A |
| off time OFF | 8~9μsec |
| wire feeding speed WS | 10m/min |
| wire tension WT | 1200g |
| dielectric fluid flow LQ | 5ℓ/min |
| dielectric fluid resistivity LR | 1×10⁴Ωcm |
| average machining voltage VC | 45~49V | stepped workpiece machining 2

Jig

| | |
|---|---|
| voltage selection Vo | 80V |
| power setting Ip | 270A |
| off time OFF | 8~9μsec |
| wire feeding speed WS | 10m/min |
| wire tension WT | 1000g |
| dielectric fluid flow LQ | 5ℓ/min |
| dielectric fluid resistivity LR | 1×10⁴Ωcm |
| average machining voltage VC | 45~49V | taper machining

FIG. 8

| switch | wire electrode diameter | 0 | 1 | 2 | 3 | 4 | 5 | 6 | 7 | 8 | 9 |
|---|---|---|---|---|---|---|---|---|---|---|---|
| voltage selection (Vo) | ALL | 0 | ↓ | ↓ | ↓ | ↓ | ↓ | ↓ | ↓ | ↓ | ↓ |
| power setting (Ip) | 0.3 | 0 | −30A | −30A | −30A | −60A | −90A | −120A | −150A | −180A | −210A |
|  | 0.25 | 0 | −30A | −30A | −30A | −30A | −60A | −90A | −120A | −150A | −180A |
|  | 0.2 | 0 | −30A | −30A | −30A | −30A | −30A | −60A | −90A | −120A | −120A |
| off time (OFF) | ALL | 0 | 0 | 0 | 0 | +1μsec | +2μsec | +3μsec | +4μsec | +5μsec | +7μsec |
| wire feeding speed (WS) | ALL | 0 | 0 | 0 | −2m/min | −2m/min | −2m/min | −2m/min | −2m/min | −4m/min | −4m/min |
| wire tension (WT) | ALL | 0 | ↓ | ↓ | ↓ | ↓ | ↓ | ↓ | ↓ | ↓ | ↓ |
| dielectric fluid flow (LQ) | ALL | 0 | ↓ | ↓ | ↓ | ↓ | ↓ | ↓ | ↓ | ↓ | ↓ |
| dielectric fluid resistivity (LR) | ALL | 0 | ↓ | ↓ | ↓ | ↓ | ↓ | ↓ | ↓ | ↓ | ↓ |
| average machining voltage (VC) | ALL | 0 | 0 | +5V | +5V | +5V | +10V | +10V | +10V | +10V | +10V |

FIG. 12

| machining information number | 105 | 106 | 107 | 108 | 109 | 110 | 111 | 112 | 113 | 114 |
|---|---|---|---|---|---|---|---|---|---|---|
| wire electrode (w) | 3 | 3 | 3 | 3 | 3 | 3 | 3 | 3 | 3 | 3 |
| work piece (m) | 1 | 1 | 1 | 1 | 1 | 1 | 1 | 1 | 1 | 1 |
| plate thickness (t) | 5 | 5 | 5 | 5 | 5 | 5 | 5 | 6 | 6 | 6 |
| discharge-energy (E) | 10 A | 8 A | 6 A | 4 A | 2 A | 1 A | 0.5 A | 10 A | 8 A | 6 A |
| voltage selection (Vo) | 80 V | 80 V | 80 V | 70 V | 60 V | 50 V | 50 V | 85 V | 85 V | 85 V |
| power setting (Ip) | 300A | 250A | 200A | 150A | 100A | 50A | 25A | 300A | 250A | 200A |
| off time (OFF) | 10 μSEC | 10 μSEC | 10 μSEC | 12 μSEC | 12 μSEC | 5 μSEC | 5 μSEC | 10 μSEC | 10 μSEC | 10 μSEC |
| on time (τp) | 1 μSEC | 2 μSEC | 2 μSEC | 2 μSEC | 2 μSEC | 1 μSEC | 1 μSEC | 2 μSEC | 2 μSEC | 2 μSEC |
| wire feeding speed (WS) | 5m/min | 5m/min | 5m/min | 5m/min | 5m/min | 5m/min | 5m/min | 5m/min | 5m/min | 5m/min |
| wire tension (WT) | 1000g | 1000g | 1000g | 1000g | 1000g | 1000g | 1000g | 1000g | 1000g | 1000g |
| dielectric fluid flow (LQ) | 10 ℓ/min | 10 ℓ/min | 10 ℓ/min | 10 ℓ/min | 10 ℓ/min | 10 ℓ/min | 10 ℓ/min | 10 ℓ/min | 10 ℓ/min | 10 ℓ/min |
| dielectric fluid resistivity (LR) | 50000Ωcm | 50000Ωcm | 50000Ωcm | 50000Ωcm | 50000Ωcm | 50000Ωcm | 50000Ωcm | 50000Ωcm | 50000Ωcm | 50000Ωcm |
| condenser capacity (Co) | 1.5 μF | 1.5 μF | 1.5 μF | 1.0 μF | 1.0 μF | 0.2 μF | 0.1F | 1.5 μF | 1.5 μF | 1.5 μF |
| servo voltage (Vg) | 40 V | 45 V | 50 V | 50 V | 50 V | 30 V | 25 V | 40 V | 45 V | 50 V |
| table feeding speed (F) | 3.0 | 2.5 | 2.0 | 1.5 | 5.0 | 5.0 | 5.0 | 3.0 | 2.5 | 2.0 |
| table feeding speed (F) | mm/min | mm/min | mm/min | mm/min | mm/min | mm/min | mm/min | mm/min | mm/min | mm/min |
| discharge gap (G) | 40 μm | 35 μm | 30 μm | 25 μm | 10 μm | 7 μm | 6 μm | 45 μm | 40 μm | 35 μm |
| finishing allowance (S) | 0 μm | 0 μm | 0 μm | 0 μm | 60 μm | 20 μm | 10 μm | 0 μm | 0 μm | 0 μm |

FIG. 13

| machining order | parameter of machining surface roughness | | | | | | |
|---|---|---|---|---|---|---|---|
| | | 1 | 2 | 3 | 4 | 5 | 6 |
| first | | over10A | under10A | under10A | under10A | under6A | under4A |
| second | | under2A | under2A | under2A | under2A | under1A | |
| third | | under2A | under1A | under1A | | | |
| fourth | | under1A | under0.5A | | | | |
| fifth | | under0.5A | | | | | |
| sixth | | under0.2A | | | | | |
| seventh | | | | | | | |
| machining number | | 6 | 4 | 3 | 2 | 2 | 1 |

FIG. 14

| machining condition column number (C) | 100 | | | | | | |
|---|---|---|---|---|---|---|---|
| machining order | 1 | 2 | 3 | 4 | 5 | 6 | 7 |
| voltage selection (Vo) | 80 V | 60 V | 50 V | | | | |
| power setting (Ip) | 300 A | 100 A | 50 A | | | | |
| off time (OFF) | 10 μSEC | 12 μSEC | 5 μSEC | | | | |
| on time (τp) | 1 μSEC | 2 μSEC | 1 μSEC | | | | |
| wire feeding speed (WS) | 5m/min | 5m/min | 5m/min | | | | |
| wire tension (WT) | 1000g | 1000g | 1000g | | | | |
| dielectric fluid flow (LQ) | 10 ℓ/min | 10 ℓ/min | 10 ℓ/min | | | | |
| dielectric fluid resistivity (LR) | 500000Ωcm | 500000Ωcm | 500000Ωcm | | | | |
| condenser capacity (Co) | 1.5 μF | 1.0 μF | 0.2 μF | | | | |
| servo voltage (Vg) | 40 V | 50 V | 30 V | | | | |
| table feeding speed (F) | 3.0 mm/min | 5.0 mm/min | 5.0 mm/min | | | | |
| offset amount (H) | 187 μm | 127 μm | 107 μm | | | | |
| machining number | 3 | | | | | | |

FIG. 15 PRIOR ART

| | wire electrode | workpiece | plate thickness (mm) | dielectric fluid flow rate (l/min) valve fully opened | | |
|---|---|---|---|---|---|---|
| | brass φ0.2 | SKD-11 | 60 | top 3~4 | bottom 4~6 | |
| machining classification | standard machining | | | | taper machining | stepped workpiece machining | start machining |
| | 1 | 2 | | | | top | bottom | |
| voltage selection Vo (V) | 85 | 85 | 85 | 85 | 85 | 10 | 20 | 30 |
| power setting Ip (A) | 270 | 240 | 210 | 180 | 150 | 85 | 85 | 85 |
| off time OFF (μsec) | 9~10 | 9~10 | 9~10 | 9~10 | 120 | 240 | 240 | 150 |
| | | | | | 9~10 | 9~10 | 9~10 | 14 |
| wire feeding speed WS (m/min) | 12 | 12 | 10 | 10 | 10 | 10 | 10 | 8 |
| wire tension WT (g) | 1000 | 1200 | 1200 | 1200 | 1200 | 1000 | 1200 | 1000 |
| dielectric fluid flow LQ (l) | 5 | 5 | 5 | 5 | 5 | 5 | 5 | 5 |
| dielectric fluid resistivity LR (Ωcm) | 1×10⁴ | 1×10⁴ | 1×10⁴ | 1×10⁴ | 1×10⁴ | 1×10⁴ | 1×10⁴ | 1×10⁴ |
| average machining voltage VC (V) | 38~44 | 38~44 | 38~44 | 38~44 | 38~44 | 45~49 | 45~49 | 50~55 |
| set machining speed FA (mm/min) | 2.5 | 2.2 | 2.0 | 1.7 | 1.4 | 1.6 | 1.6 | 0.5 |
| real machining speed FC (mm/min) | 2.46~2.22 | 2.21~1.97 | 1.96~1.71 | 1.71~1.45 | 1.44~1.19 | 1.61~1.47 | 1.61~1.47 | 0.5~0.3 |
| offset amount (μm) | 148~153 | 146~151 | 144~149 | 142~147 | 141~146 | 149~154 | 149~154 | |
| | | | | | 130~135 | | | |
| machining surface roughness (μmRmax) | 20~18 | 19~17 | 17~15 | 15~13 | 14~12 | 19~17 | 19~17 | |
| | | | | | 12~10 | | | |

FIG. 16 PRIOR ART

| wire electrode | workpiece | plate thickness (mm) |
|---|---|---|
| brass φ0.2 | SKD-11 | 60 |

| | start | ⟨18~20⟩ only 1st | ⟨12~14⟩ 1st | ⟨12~14⟩ up to 2nd | ⟨6~8⟩ 1st | ⟨6~8⟩ 2nd | ⟨6~8⟩ up to 3rd | ⟨3~5⟩ 1st | ⟨3~5⟩ 2nd | ⟨3~5⟩ up to 3rd |
|---|---|---|---|---|---|---|---|---|---|---|
| machining surface roughness (μmRmax) | | | | | | | | | | |
| machining frequency | | | | | | | | | | |
| voltage selection Vo (V) | 85 | 85 | 85 | 80 | 85 | 80 | 100 | 80 | 80 | 140 |
| power setting Ip (A) | 150 | 240 | 240 | 120 | 240 | 120 | 30 | 240 | 120 | 20 |
| off time OFF (μsec) | 30 | 9 | 9 | 30 | 9 | 30 | 1 | 10 | 35 | 10 |
| wire feeding speed WS (m/min) | 8 | 12 | 12 | 10 | 12 | 10 | 10 | 12 | 12 | 12 |
| wire tension WT (g) | 1200 | 1200 | 1200 | 1800 | 1200 | 1800 | 1800 | 1400 | 1800 | 1800 |
| dielectric fluid flow LQ (ℓ) | 5 | 5 | 5 | 1 | 5 | 1 | 1 | 5 | 1 | 1 |
| dielectric fluid resistivity LR (Ωcm) | 1×10⁵ | 1×10⁵ | 1×10⁵ | 1×10⁵ | 1×10⁵ | 1×10⁵ | 1×10⁵ | 1×10⁵ | 1×10⁵ | 1×10⁵ |
| average machining voltage VC (V) | 50 | 38 | 38 | 45~55 | 38 | 45~55 | 40~50 | 40 | 35~45 | 13~19 |
| set machining speed FA (mm/min) | 0.8 | 2.0 | 2.0 | 3.0 | 2.0 | 3.0 | 3.0 | 2.0 | 1.5 | 1.8 |
| real machining speed FC (mm/min) | | 1.8~2.0 | 1.8~2.0 | 3.0~6.0 | 1.8~2.0 | 3.0~6.0 | 3.0~9.0 | 1.8~2.0 | 1.5~3.0 | 3.6~5.4 |
| offset amount (μm) | | 145 | 170 | 110 | 184 | 124 | 109 | 192 | 127 | 107 |

FIG. 21
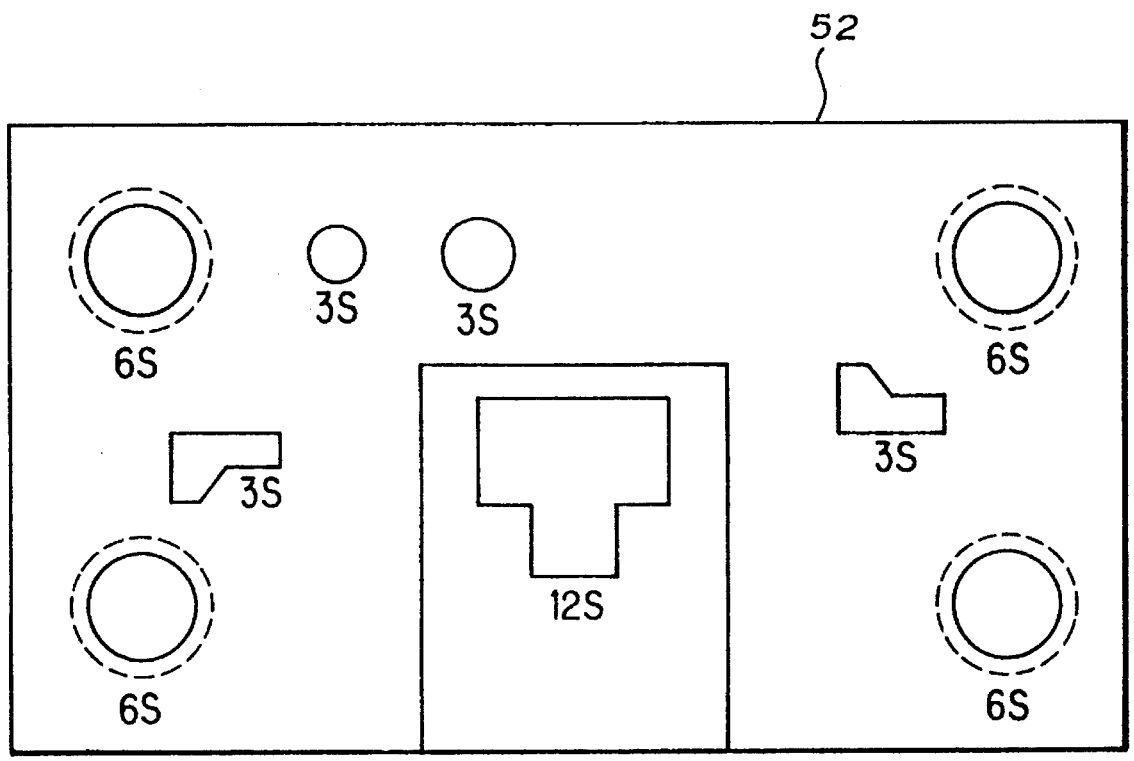
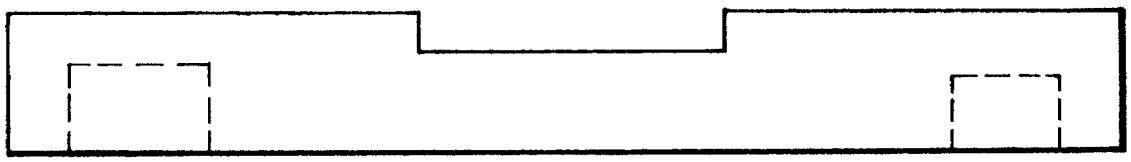

ELECTRICAL DISCHARGE MACHINING APPARATUS AND METHOD

FIELD OF THE INVENTION

This invention generally relates to an electrical discharge machining apparatus in which machining is carried out by electric discharge between an electrode and a workpiece, and more particularly to an electrical discharge machining apparatus in which machining conditions can be easily changed, and further relates to an electrical discharge machining method and a machine therefor in which machining data can be automatically retrieved and machining condition columns can be automatically created.

BACKGROUND OF THE INVENTION

In a conventional wire electrical discharge machining apparatus, machining conditions must be previously set. It is typical that the machining conditions are provided from a machining condition table. The machining condition table ordinarily is loaded manually, by an operator input through a keyboard, and is changed in the same manner. Typically, the machining condition table is organized in accordance with applicable parameters such as workpiece materials, wire diameter, workpiece thickness, etc. There are multiple selections for each of the parameters, and an appropriate one may be selected for preventing the wire from being broken. Conditions such as taper machining and stepped workpiece machining also may be described in the machining condition tables. SKD-11, WC-Co, copper, graphite, etc. are examples of workpiece materials. $\phi 0.1$, $\phi 0.15$, $\phi 0.2$, $\phi 0.25$, $\phi 0.3$, etc. are examples of wire diameter. 5 mm, 10 mm, 20 mm, 30 mm, etc. are examples of workpiece thickness.

Depending on the desired machining surface roughness, there are plural machining condition patterns such as single pass machining, two pass machining, three pass machining, etc. FIG. 15 shows an example of a machining condition table for single pass machining. FIG. 16 shows an example of a machining condition table for plural pass machining. A numerical value based on applicable units is applied to each machining condition. The numerical values for a group of plural machining conditions, applicable to a given roughness, may be memorized in a numerical control unit.

The machining conditions (and an example of applicable units) may comprise the following eight factors, for example:

Vo (voltage selection): switch to select gap voltage when no load is applied (V);

Ip (power setting): switch to select peak current between gaps (A);

OFF (off time): switch to change off time (μ sec);

WS (wire feeding speed): switch to adjust wire feeding speed (m/min);

WT (wire tension): switch to adjust wire tension (g);

LQ (dielectric fluid flow): switch to adjust dielectric fluid flow (1/min);

LR (dielectric fluid resistivity): switch to adjust dielectric fluid resistivity ($\Omega$cm);

VC (average machining voltage): switch to adjust average machining voltage to a target value in machining at optimal feeding (v).

FIG. 17 is a schematic view showing the structure of a conventional wire electrical discharge machining apparatus, wherein numeral 1 denotes a wire electrode, numeral 2 denotes a workpiece, numeral 3 denotes a selection circuit, numeral 4 denotes a switching circuit (finishing machining circuit), numeral 5 denotes a resistor, numeral 6 denotes an automatic voltage regulator, numeral 7 denotes a control circuit, oscillation circuit, logic circuit, and numeral 8 denotes a machining condition setting circuit.

In the wire electrical discharge machining apparatus, voltage is applied between the wire electrode 1 and the workpiece 2, and an electric discharge pulse arises by quickly switching a power transistor in the selection circuit 3.

FIG. 18 is a schematic view of the structure of the machining condition setting circuit 8 shown in FIG. 17, wherein numeral 11 denotes a memory for memorizing a basic machining condition group, numeral 12 denotes a machining condition calling/selecting means for calling and selecting suitable machining conditions from the memory 11, numeral 13 denotes a memory for temporarily memorizing the machining conditions called and selected by the machining condition calling/selecting means 12, and numeral 17 denotes a machining means for a machining according to the machining conditions temporarily memorized in the memory 13.

Machining condition data, such as wire electrode materials and diameter, workpiece materials and thickness, and machining surface roughness, are memorized in the memory 11. Suitable machining conditions are called and selected from the memory 11 by the machining condition calling/selecting means 12, as follows. In one method, a machining condition group number is manually set by an operator using a display of a control unit, and the corresponding stored machining conditions are called from the memory 11. However, plural groups of machining conditions cannot be called at the same time by the method. When it is necessary for machining conditions to be automatically changed from current to new conditions, the following two methods are used. In one method, a machining condition group number is set in a NC program. When the program identifies a new group, the corresponding pre-stored machining conditions are called thereby. In the other method, an automatic skim cut function is used, such function being a plural pass machining of a workpiece, each machining pass being under different, predetermined, manually input conditions. Specifically, for each cut, machining parameters are input beforehand, using a display, and assigned a group number for each of the automatic skim cuts. As a result, skim cut conditions (offset, machining condition group number, and machining speed) may be automatically selected and called, and machining may be carried out. However, even though an automatic selection occurs, the conditions in each group are fixed at the values previously input by the operator and there is no ability to automatically change each condition separately.

FIG. 19 is a flow chart showing the operation of setting machining conditions in the conventional wire electrical discharge machining apparatus. A workpiece and a machining shape are determined (step S-1). Machining surface roughness is determined (step S-2). A wire electrode is selected according to workpiece thickness and minimum corner radius (step S-3). A jig is selected according to the workpiece, the machining shape, etc. (step S-4). It is judged whether a second machining pass is necessary according to the machining surface roughness, etc. (step S-5). If necessary, second machining conditions are selected (step S-6). If unnecessary, a maximum speed condition is selected (step S-7). The machining conditions, selected in step S-6 or step S-7, are set (step S-8). It is judged whether it is necessary for the machining conditions to be changed according to unusual factors (stepped workpiece machining, taper machining, etc.) (step S-9). If necessary, machining conditions according to these factors are referred to (step S-10). The machining conditions are changed by the machining data referred to (step S-11). Necessary data is selected from fifteen kinds of data for machining conditions using a machining condition group display of the numerical control unit, and the machining conditions are changed. Thereafter, or if after step S-9 if it is not necessary for the machining conditions to be changed, machining starts (step S-12). It is judged whether the machining is stable (step S-13). If unstable, or if there is a danger that the wire may be cut, for example, the machining conditions are changed in step S-11, which is repeated until the machining becomes stable.

In the conventional wire electrical discharge machining apparatus, constructed as above, machining conditions must be manually changed by an operator for economical machining or a stable machining without having the wire break. This precludes quick machining. Further, experience in operating the machine is required.

FIG. 20 is a schematic view showing a conventional wire electrical discharge machining apparatus, wherein numeral 51 denotes a wire electrode, numeral 52 denotes a workpiece, numeral 53 denotes a table, numeral 54 denotes an X-axis motor, numeral 55 denotes a Y-axis motor, numeral 56 denotes a machining power supply, and numeral 57 denotes a main control unit.

Between the wire electrode 51 and the workpiece 52, a pulse voltage from the machining power supply 56 is applied, and an electric discharge arises. The X-axis motor 54 and the Y-axis motor 55 are moved to machine desired outline shapes, being controlled by the main control unit 57. The main control unit 57 also controls the machining power supply 56. Parameters necessary for machining are the electrical conditions of the machining power supply, table moving speed, and offset amount to magnify or reduce programmed shapes, etc.

FIG. 21 shows an example of a workpiece. There are many combinations of machining surface roughness, workpiece thickness, etc. as shown in the figure. Accordingly, many machining parameters must be set for one workpiece. Machining parameters are set by the main control unit 57. Namely, machining parameters are set according to each combination of machining surface roughness, workpiece thickness, etc. in a display of the main control unit 57. 3S, 6S, and 12S in the figure denote machining surface roughnesses. 6S denotes larger roughness than 3S, and 12S denotes further larger roughness than 6S.

In the conventional wire electrical discharge machining apparatus, machining conditions are set as above, and many machining parameters must be set beforehand using the display of the main control unit 57. Accordingly, it takes much time for preparation for machining, and errors may happen. Further, it is very complicated to set many machining parameters, and the machining parameters must be set a plurality of times for one workpiece. Moreover, only a small, finite number of machining parameter combinations may be stored for selection and use. Accordingly, the machining operation is troublesome.

SUMMARY OF THE INVENTION

Accordingly, it is an object of the invention to provide an electrical discharge machining apparatus in which machining conditions can be easily changed for quick, economical, and stable machining without having the wire break.

To attain this object, an electrical discharge machining apparatus in the invention, in which machining is carried out by electric discharge between an electrode and a workpiece, comprises:

a first memory for memorizing a basic machining condition group, a machining condition calling/selecting means for calling and selecting suitable machining conditions from the memory, a second memory for temporarily memorizing the machining conditions called and selected by the machining condition calling/selecting means, a third memory for memorizing machining condition changing programs, a switching means for controlling a machining condition changing function, and an operating means for changing the machining conditions temporarily memorized in the second memory by the machining condition changing programs that are stored in the third memory, according to a signal from the switching means, wherein machining is carried out according to the machining conditions changed by the operating means.

The switching means is for maximizing machining speed, for preventing wire-breakage, and/or for obtaining an economical machining.

In the electrical discharge machining apparatus according to the invention, by adjusting a machining condition changing switch, machining condition changing programs are called, the machining conditions called from a machining condition group and temporarily memorized are changed according to the programs, and machining is carried out according to the changed machining conditions.

It is another object of the invention to provide an electrical discharge machining method in which by automatically retrieving machining data and automatically creating machining condition columns according to machining rules, machining parameters do not need to be set in the main control unit, preparation for machining can be carried out in a short time and with accuracy, and plural machining condition columns are easily created so that a continuous machining can be easily carried out, even when there are many combinations of machining surface roughness and workpiece thickness, etc. for one workpiece.

To attain this object, in an electrical discharge machining method according to the invention, certain machining data is automatically retrieved from a machining data memorizing means for memorizing machining data according to certain parameters, the machining data retrieved is arranged in machining order according to machining rules selected according to certain parameters from a machining rule memorizing means for memorizing machining rules, parameters such as offset amount, etc. are automatically operated and machining condition columns are created.

An electrical discharge machining apparatus according to the invention comprises:

a machining data memorizing means for memorizing machining data, machining data retrieving means for automatically retrieving certain machining data according to certain parameters from the machining data memorizing means, machining rule memorizing means for memorizing machining rules, and machining condition column creating means for arranging in machining order the machining data retrieved by the machining data retrieving means according to the machining rules selected according to certain parameters from the machining rule memorizing means, automatically operating parameters such as offset amount, etc. and creating machining condition columns.

An electrical discharge machining apparatus in the invention, in which machining is carried out by electric discharge between a wire electrode and a workpiece, comprises:

machining data memorizing means for memorizing machining data such as electric conditions, table moving speed, electric discharge gap, etc., machining data retrieving means for automatically retrieving certain machining data according to parameters such as wire electrodes, workpiece materials and thickness, etc. from the machining data memorizing means, machining rule memorizing means for memorizing machining rules, and machining condition column creating means for arranging in machining order the machining data retrieved by the machining data retrieving means according to the machining rules selected according to certain parameters from the machining rule memorizing means, automatically operating parameters such as offset amount, etc., and creating machining condition columns.

The machining data retrieving means automatically retrieves the machining data from the machining data memorizing means by a retrieval command comprising retrieval factors (wire electrodes, workpiece materials and thickness, machining surface roughness) and machining condition column numbers.

In the electrical discharge machining method and the machine therefor according to the invention, certain machining data related to wire electrodes, workpiece materials and thickness, etc. is automatically retrieved from the machining data memorizing means by the machining data retrieving means. Machining rules are selected according to machining surface roughness, etc. from the machining rule memorizing means. The machining data retrieved by the machining data retrieving means is arranged in machining order according to the machining rules selected, and parameters such as offset amount, etc. are automatically operated. As a result, machining parameters do not need to be set using the display of the main control unit, and even when there are many combinations of machining surface roughness, workpiece thickness, etc., for one workpiece, the machining parameters can be easily set by machining condition column numbers. The machining data can be automatically retrieved by the retrieval command comprising the retrieval factors and the machining condition column numbers. As a result, the machining parameters can be set by NC data created outside the machine.

Other objects and features of this invention will become understood from the following description with reference to the accompanying drawings.

BRIEF DESCRIPTION OF THE DRAWINGS

The invention will be described in more detail in conjunction with the following drawings, wherein:

FIG. 8 shows an example of machining condition changing programs according to the invention for preventing the wire from being broken.

FIG. 12 is a table showing an example of machining data.

FIG. 13 is a table showing an example of machining rules.

FIG. 14 is a table showing an example of machining condition columns.

FIG. 15 shows an example of a machining condition table for a one time machining in a conventional electrical discharge machining apparatus.

FIG. 16 shows an example of a machining condition table for a plural time machining in the conventional electrical discharge machining apparatus.

FIG. 21 shows an example of a workpiece.

DESCRIPTION OF THE PREFERRED EMBODIMENTS

Figure 1:
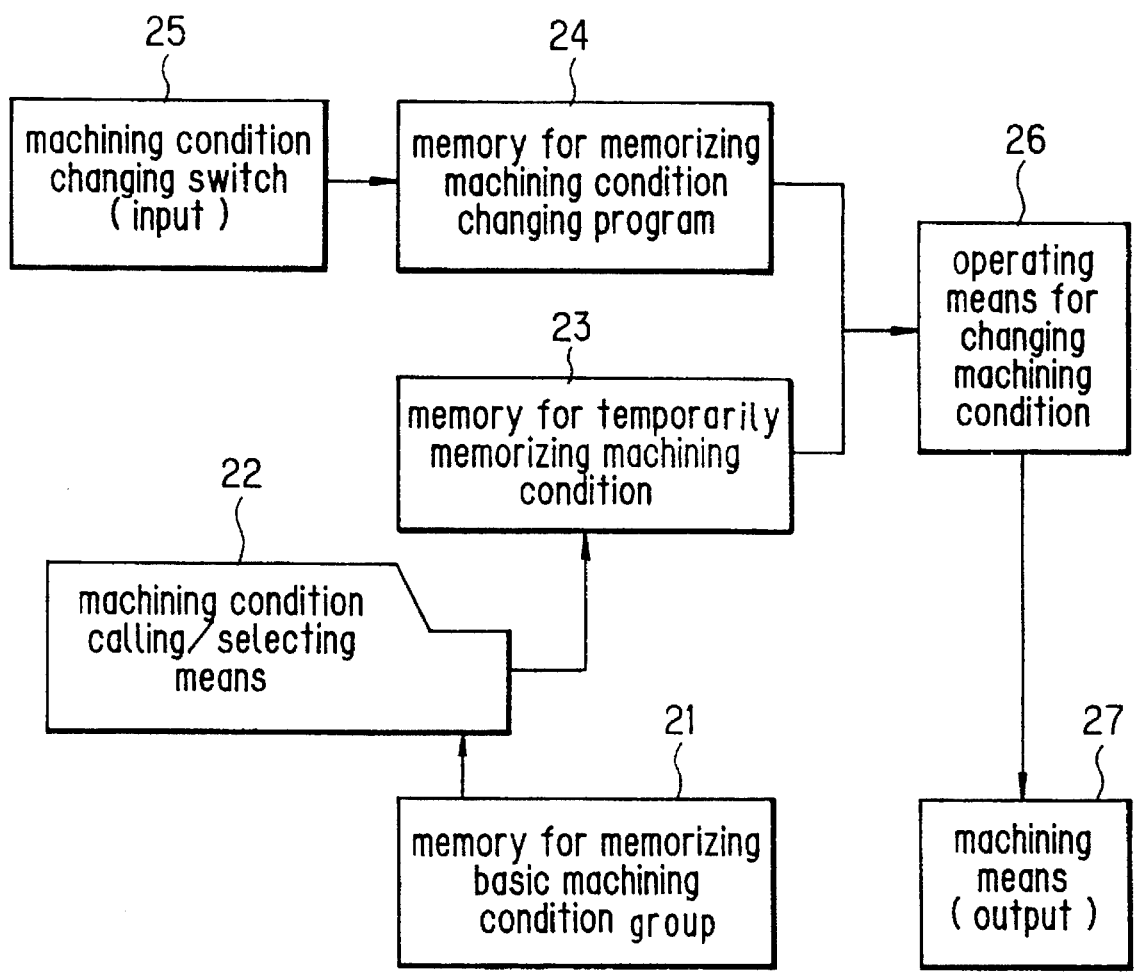
FIG. 1 is a block diagram showing the structure of a machining condition setting circuit in a preferred embodiment of the invention.

FIG. 1 shows structure of a machining condition setting circuit in a preferred embodiment of the invention, wherein numeral 21 denotes a memory for memorizing a basic machining condition group, numeral 22 denotes a machining condition calling/selecting means for calling and selecting suitable machining conditions from the memory 21, numeral 23 denotes a memory for temporarily memorizing the machining conditions called and selected by the machining condition calling/selecting means 22, numeral 24 denotes a memory for memorizing machining condition changing programs, numeral 25 denotes a machining condition changing switch for selecting a program stored in memory 24, numeral 26 denotes an operating means for changing the machining conditions temporarily memorized in the memory 23 by the machining condition changing program memorized in the memory 24 and selected, according to a signal from the switch 25, and numeral 27 denotes a machining means for executing a machining operation according to the machining conditions changed by the operating means 26.

Figure 2:
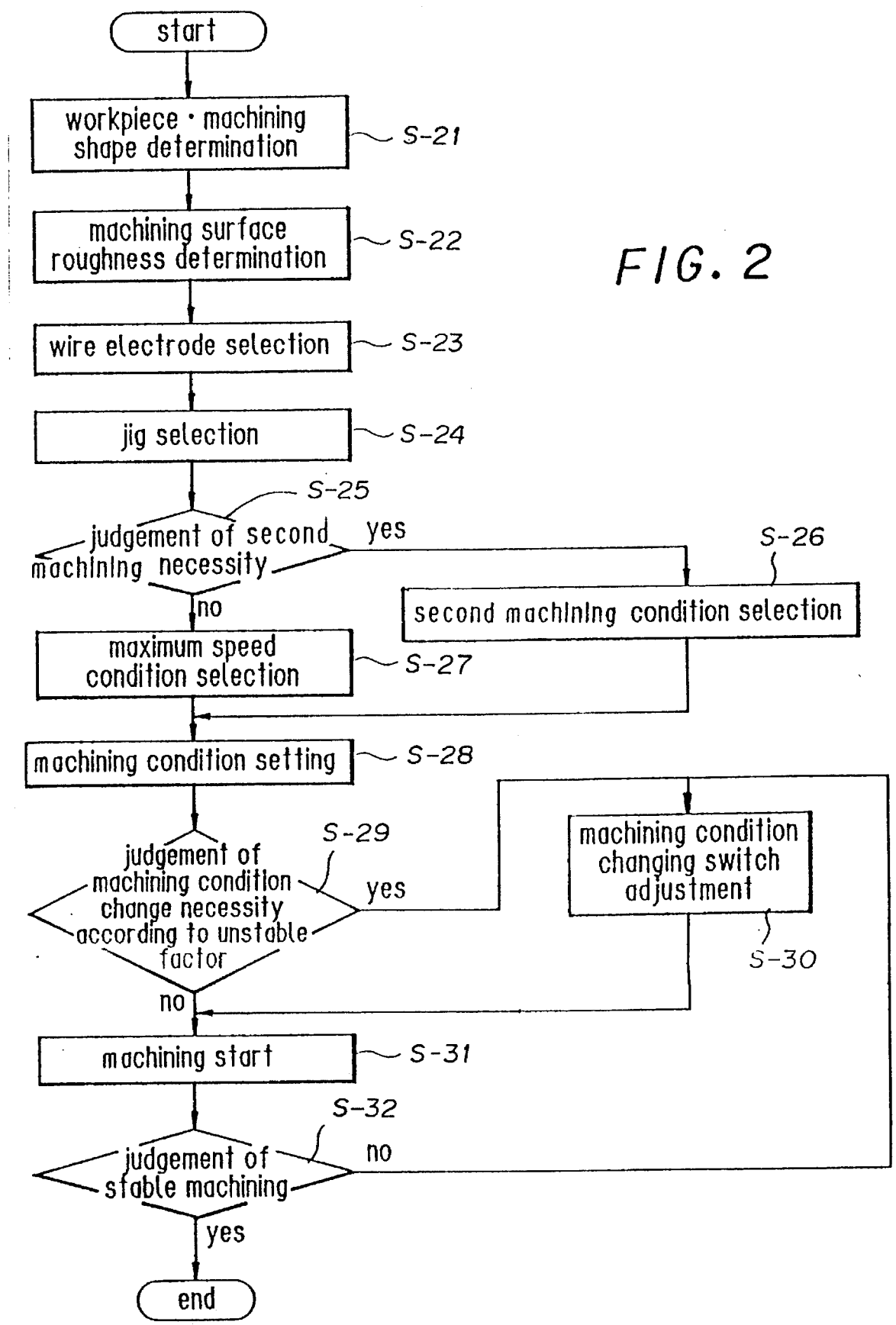
FIG. 2 is a flow chart showing the operation in the machining condition setting circuit shown in FIG. 1.
Figure 19:
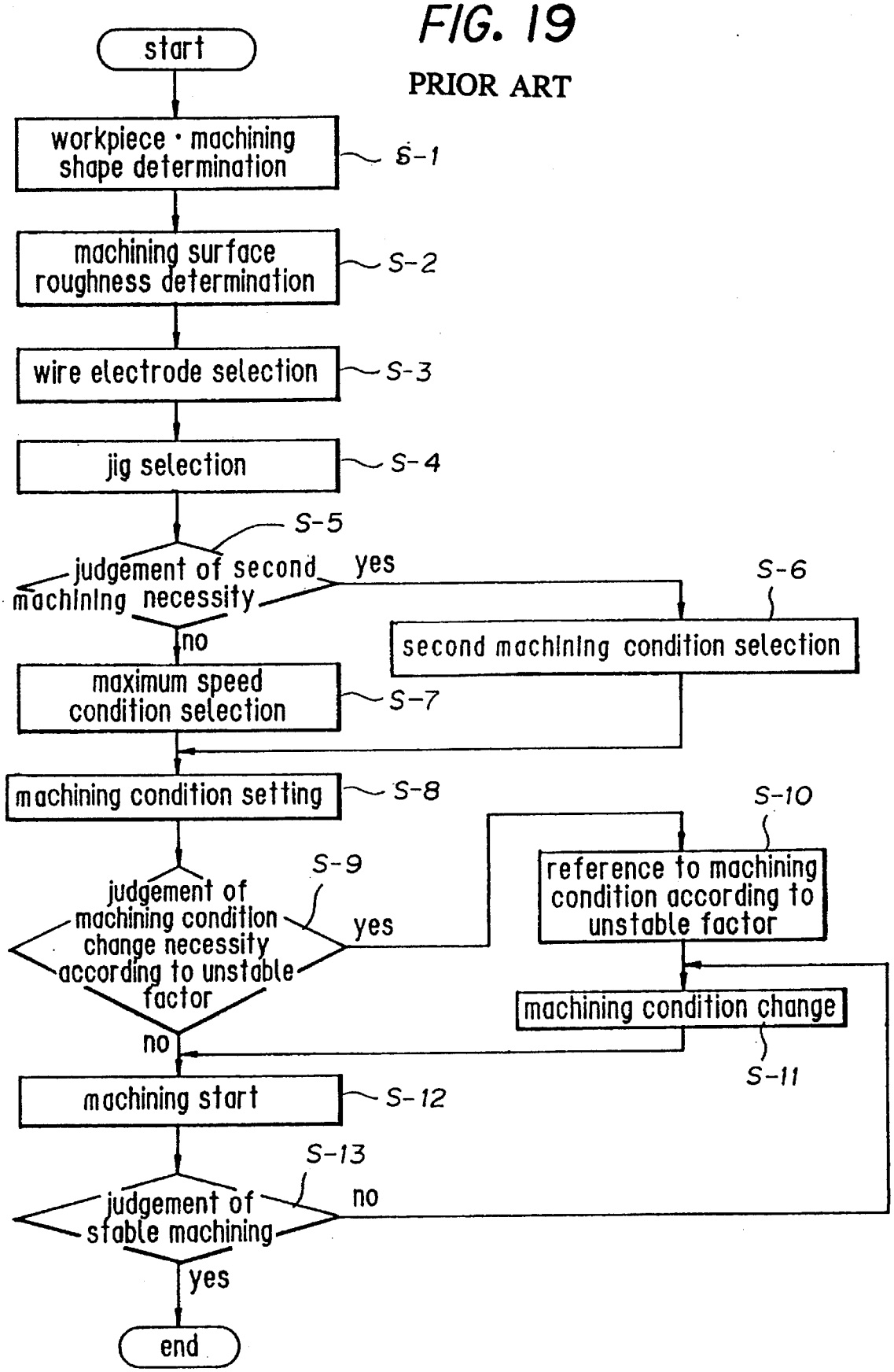
FIG. 19 is a flow chart showing the operation of the machining condition setting circuit shown in FIG. 18.
Figure 20:
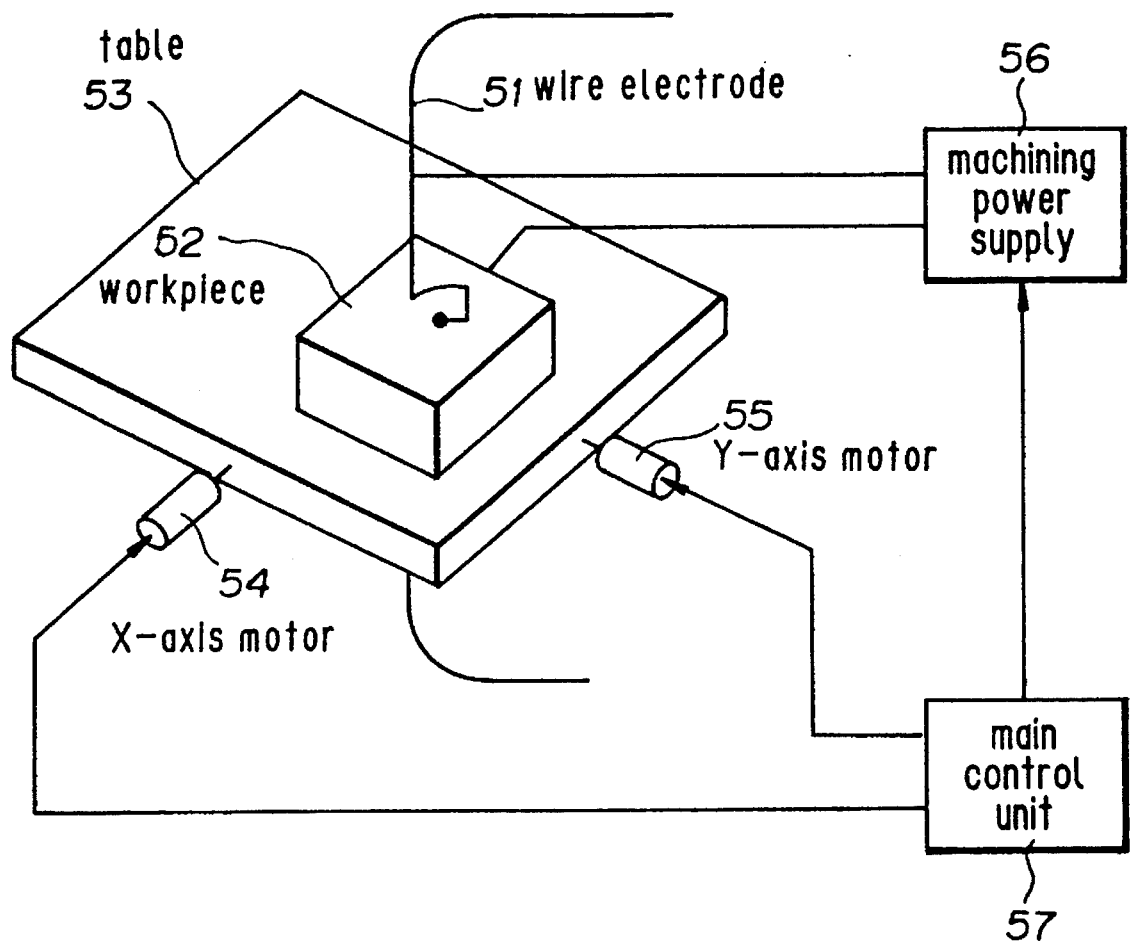
FIG. 20 is a schematic view showing the structure of a conventional wire electrical discharge machining apparatus.

Operation of the machining condition setting circuit is shown in FIG. 2. Steps S-21 to S-29, S-31, and S-32 are the same as respective steps S-1 to S-9, S-12 and S-13 in the conventional machining condition setting circuit shown in FIG. 19. Following the execution of step S-29, when it is judged that it is necessary for the machining conditions to be changed, the machining condition changing switch is adjusted in step S-30. A machining condition changing program is selected on the basis of the switch position and the machining conditions are automatically changed thereby.

A program for achieving optimum machining speed, a program for preventing a wire break, and a program for economical machining, are examples of the machining condition changing programs. The program for optimizing machining speed involves a control of machining speed and machining time. The program for preventing a wire break is used to set conditions so that the wire may not be broken. The program for economical machining is used to control wire feeding speed and to reduce the consumption of electric power by the wire electrode.

Machining conditions comprising Vo, Ip, OFF, SA, SB, etc. are changed by the machining condition changing program. FIG. 8 shows a simple example of a machining condition changing program for preventing the break of the wire. In this program, there are ten switches(0–9) for setting the appropriate machining conditions. If the program operates the switch 0, a set of optimum machining conditions are specified. If the program selects any one of the switches 1–9 instead, the machining conditions are changed. As shown, the larger the switch number, the more the likelihood of a wire break is prevented. A similar programmed selection of machining conditions, including optimum and alternative conditions, may be obtained for speed and economical operation.

Figure 3:
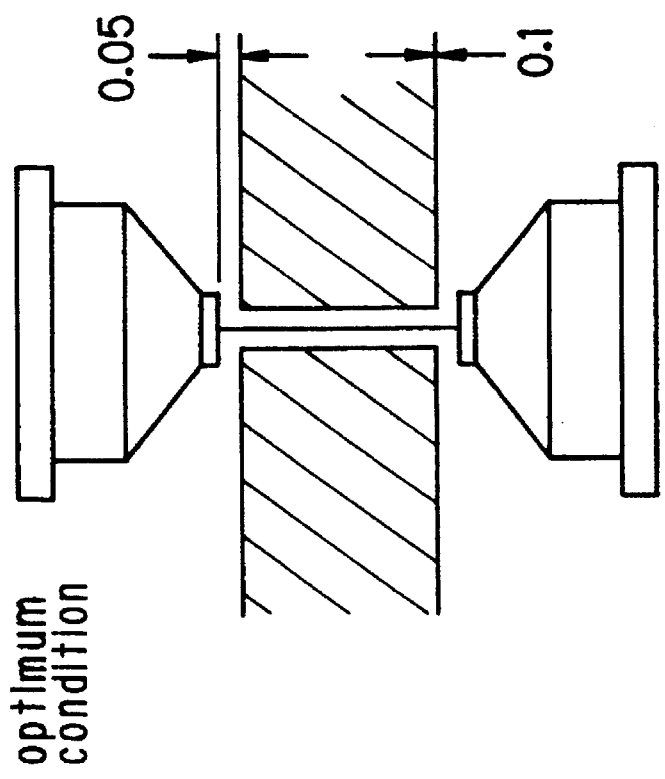
FIG. 3 shows an example of machining conditions under optimum conditions according to the invention.
Figure 4:
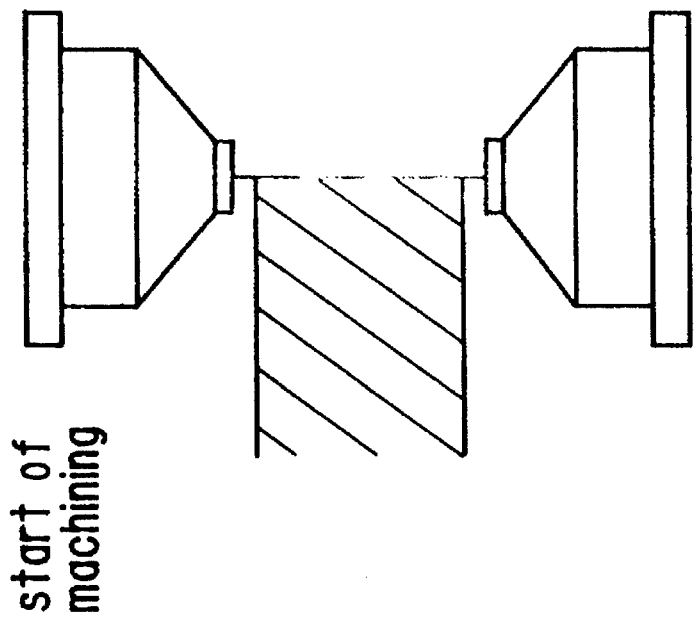
FIG. 4 shows an example of machining conditions that are changed for a start machining according to the invention.
Figure 5:
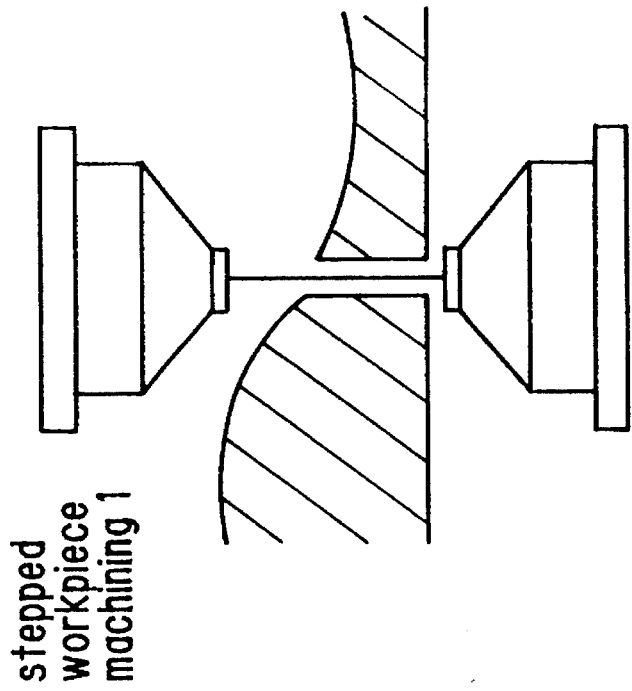
FIG. 5 shows an example of machining conditions that are changed for a stepped workpiece machining according to the invention.
Figure 6:
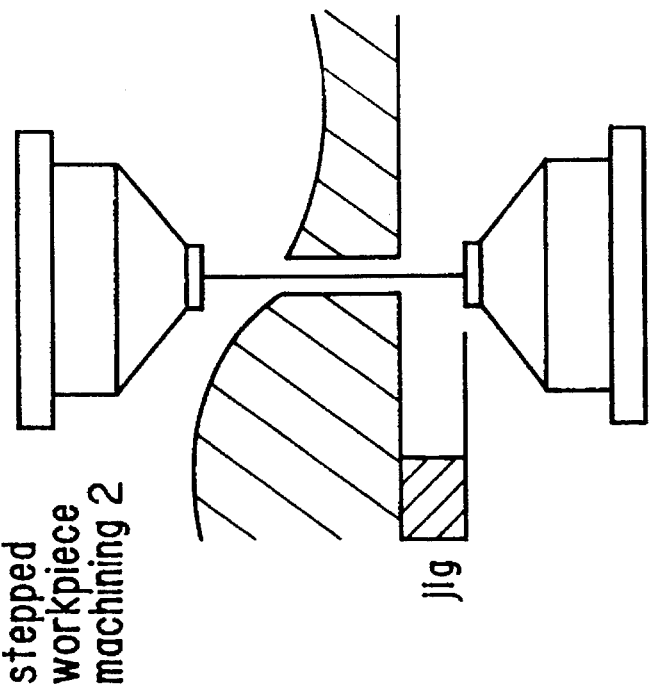
FIG. 6 shows an example of machining conditions changed for a stepped workpiece machining using a jig according to the invention.
Figure 7:
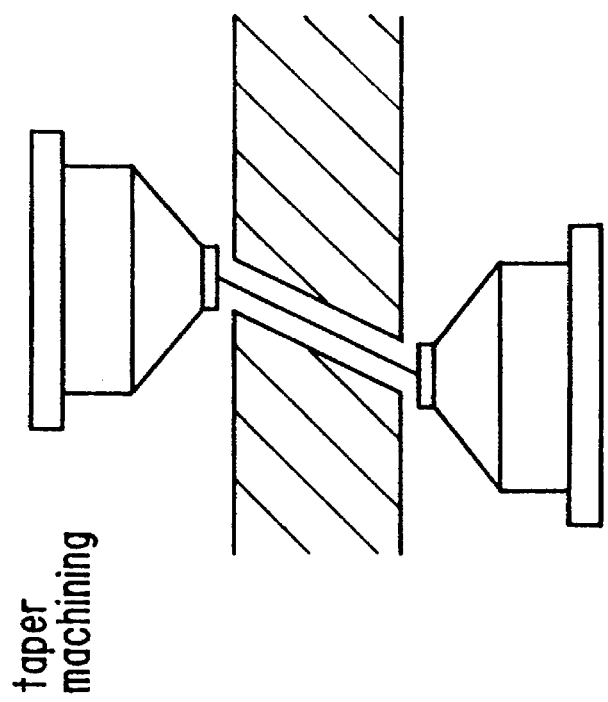
FIG. 7 shows an example of machining conditions changed for a taper machining according to the invention.

Various kinds of machining condition changing programs can be used. For example, eight optimum machining conditions are shown in FIG. 3. These conditions can be changed to conditions that are appropriate for a start of a machining operation, a stepped-workpiece machining operation, or a taper machining operation, for example. These changed conditions are respectively shown in FIG. 4, 5, 6 and 7. In the figures, a workpiece of SKD-11 having 40 mm thickness and a wire electrode of brass having φ0.2 diameter is used as an example, and the group of relevant machining conditions for each operation are identified. In FIG. 4–7, the changed conditions for each operation are framed in bold lines. By creating machining condition changing programs that reflect the machining conditions for each of several different operations, any kind of machining can quickly be selected and carried out in a stable manner.

According to the electrical discharge machining apparatus of the present invention, constructed as above, machining conditions can be easily changed by a switch for a quick, economical, and stable machining without wire-breakage.

Figure 9:
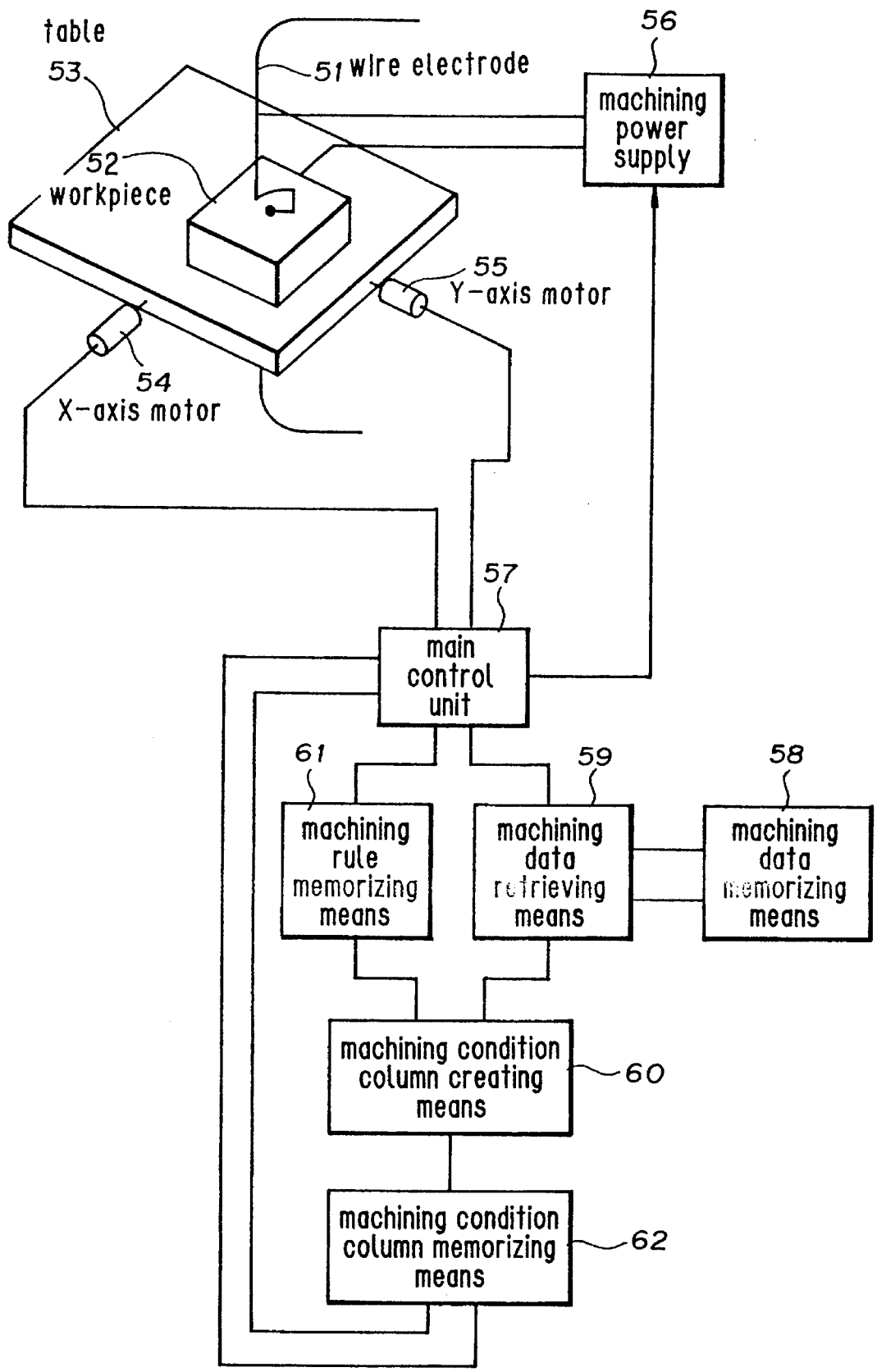
FIG. 9 is a schematic view showing the structure of a wire electrical discharge machining apparatus according to a preferred embodiment of the invention.

FIG. 9 shows the structure of a wire electrical discharge machining apparatus in another preferred embodiment of the invention, wherein numeral 58 denotes a machining data memorizing means for memorizing machining data, numeral 59 denotes a machining data retrieving means for automatically retrieving the machining data from the machining data memorizing means 58, numeral 60 denotes a machining condition column creating means for creating machining condition columns according to the machining data retrieved by the machining data retrieving means 59, machining rules, and parameters such as offset amount, etc. automatically operated, numeral 61 denotes a machining rule memorizing means for memorizing machining rules for creating machining condition columns, and numeral 62 denotes a machining condition column memorizing means for memorizing the machining condition columns created by the machining condition column creating means 60.

The machining data memorized in the machining data memorizing means 58 is retrieved by the machining data retrieving means 59. The machining rules are selected from the machining rule memorizing means 61. In the machining condition column creating means 60, the machining data retrieved by the machining data retrieving means 59 is arranged in machining order according to the machining rules selected, parameters such as offset amount, etc. are automatically operated (i.e. entered), and machining condition columns are created. The machining condition columns thus created are memorized in the machining condition column memorizing means 62. Thereafter, according to machining frequency, machining data such as electrical conditions, offset amount, table moving speed, etc. is retrieved up from the machining condition columns, and machining is carried out.

Figure 10:
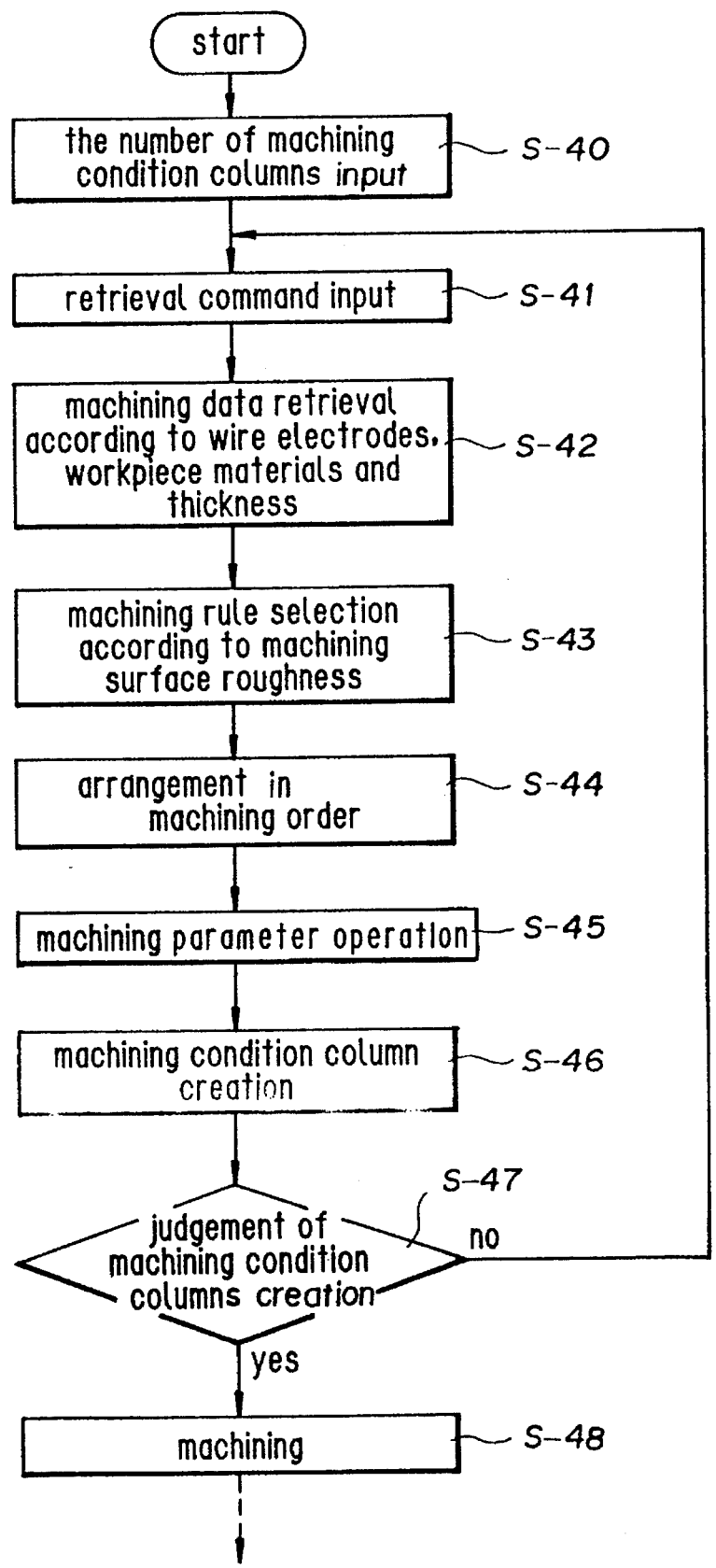
FIG. 10 is a flow chart showing an operation for creating machining condition columns in accordance with the invention.

The operation of creating the machining condition columns is described in conjunction with a flow chart in FIG. 10. The number of machining condition columns to be created is inputted (step S-40). A retrieval command for the first one of plural combinations of machining surface roughness, workpiece thickness, etc. is inputted (step S-41). The retrieval command comprises retrieval factors (wire electrodes, workpiece materials and thickness, machining surface roughness) and machining condition column numbers, as follows:

retrieval command: G99WwMmTtRrCc w: parameter of wire electrodes m: parameter of workpiece materials t: parameter of workpiece thickness r: parameter of machining surface roughness c: machining condition column numbers The machining data according to the parameters, w, m, and t is retrieved from the machining data memorizing means 58 (step S-42). A machining rule according to the parameter r is selected from the machining rule memorizing means 61 (step S-43). According to the machining rule, necessary data is picked up from the machining data retrieved, and is arranged in machining order (step S-44). The machining rules are used to determine machining frequency and machining order. The machining order is determined by the electric discharge energy amount in the machining data. Data in the machining data is as follows.

E: electric discharge energy amount

Vo: voltage selection

WS: wire feeding speed

Ip: power setting

WT: wire tension

OFF: off time

LQ: dielectric fluid flow

τP: on time

LR: dielectric fluid resistivity

Co: condenser capacity

Vg: servo voltage
F: table moving speed
G: electric discharge gap
S: finishing allowance One of the machining condition columns, for example, comprises electric conditions Vo–Vg, table moving speed F, and offset amount. The offset amount needs to be applied (step S-45), and an expression therefor using the machining data is as follows:

$$Hj = W/2 + G_n + \sum_{k=1}^{n} Sk - \sum_{k=1}^{j} Sk$$

H: offset amount
n: whole machining frequency
D: wire diameter
j: machining order The electrical conditions, the table moving speed, and the offset amount arranged in machining order becomes a machining condition column (step S-46), and necessary numbers of columns are created by the retrieval command. It is judged whether all of the machining condition columns are created (step S-47). If all have been created, machining is then carried out (step S-48).

Figure 11:
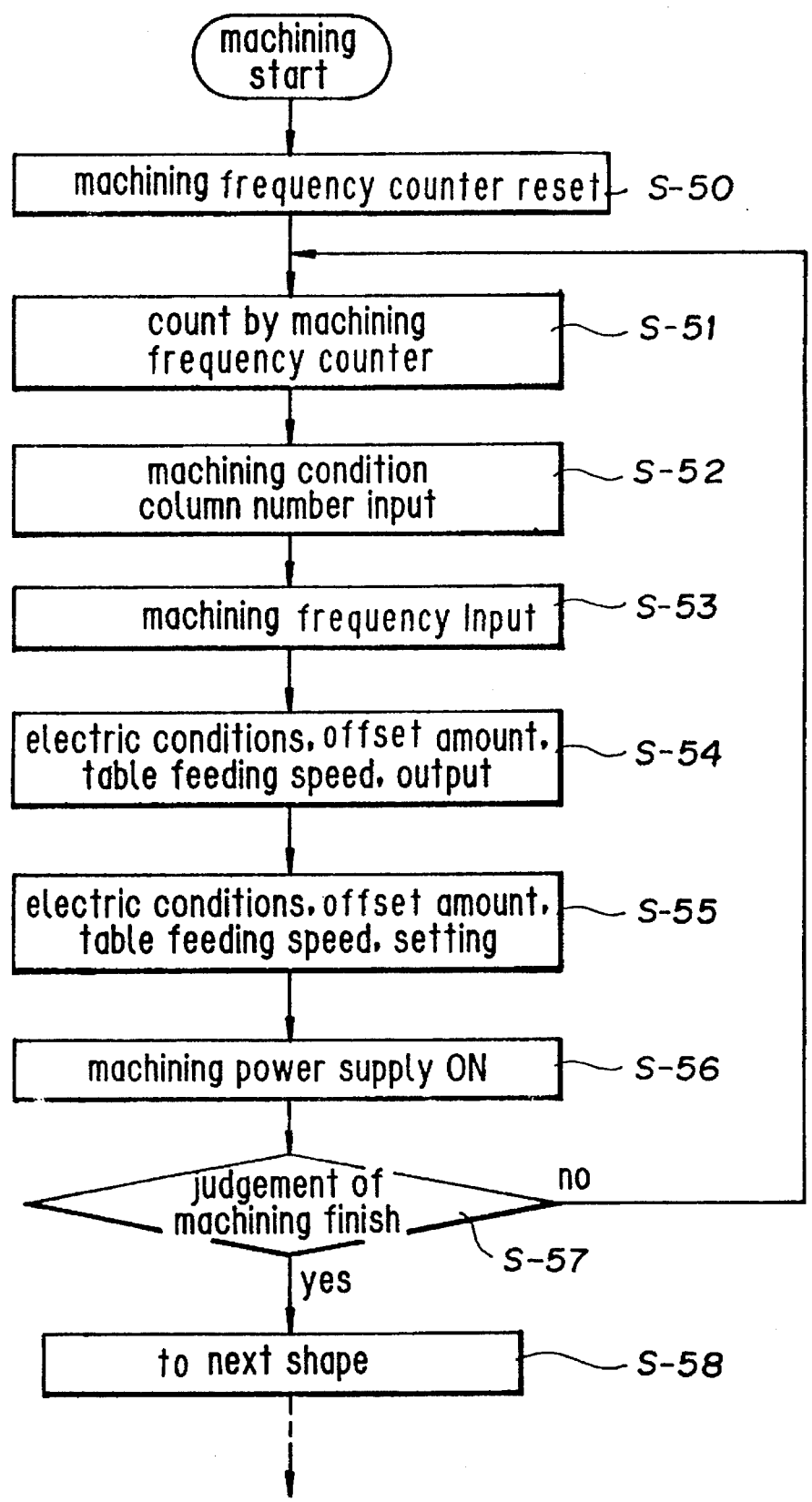
FIG. 11 is a flow chart showing a machining operation using the machining condition columns according to the invention.
Figure 17:
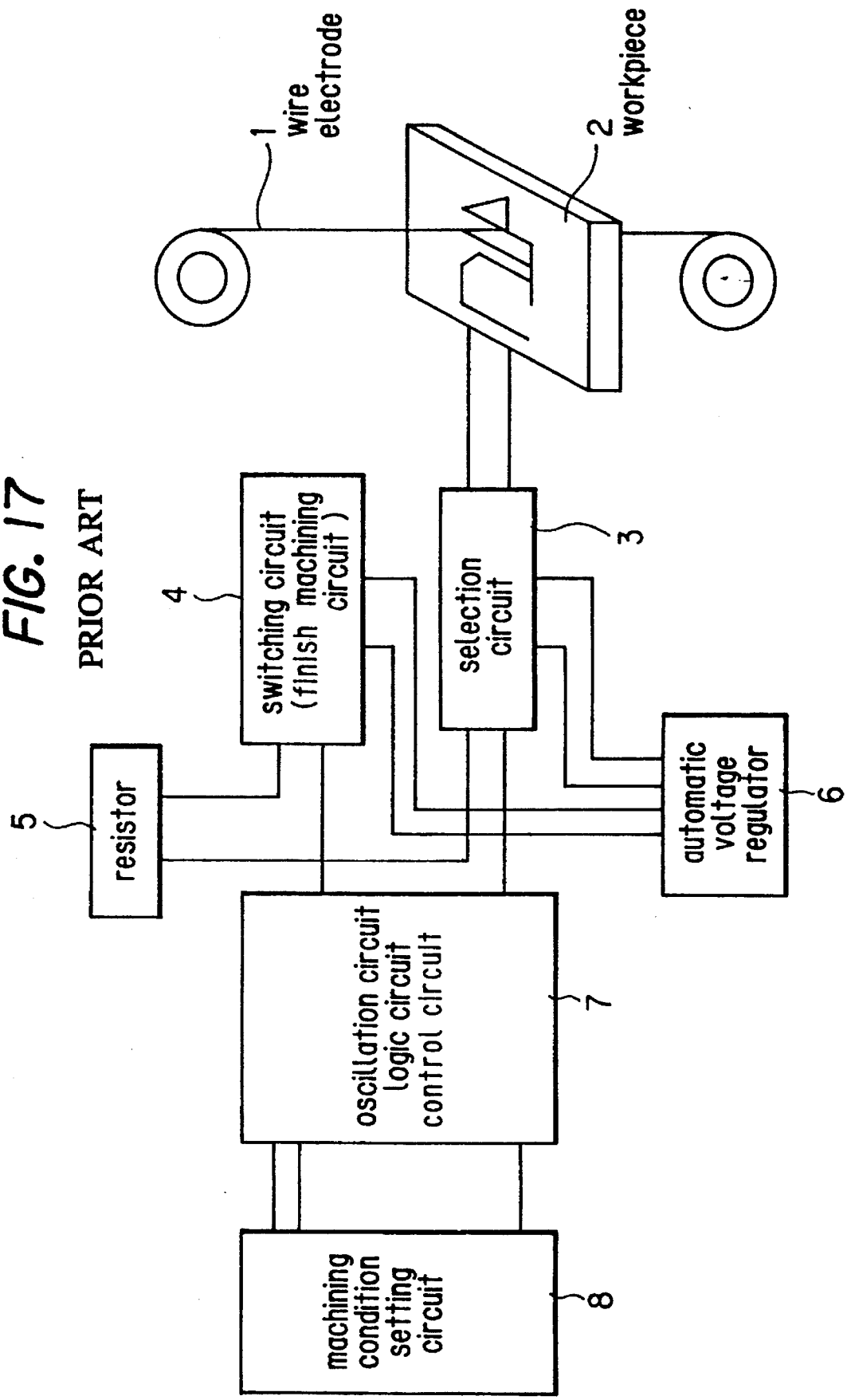
FIG. 17 is a schematic view showing structure of the conventional wire electrical discharge machining apparatus.
Figure 18:
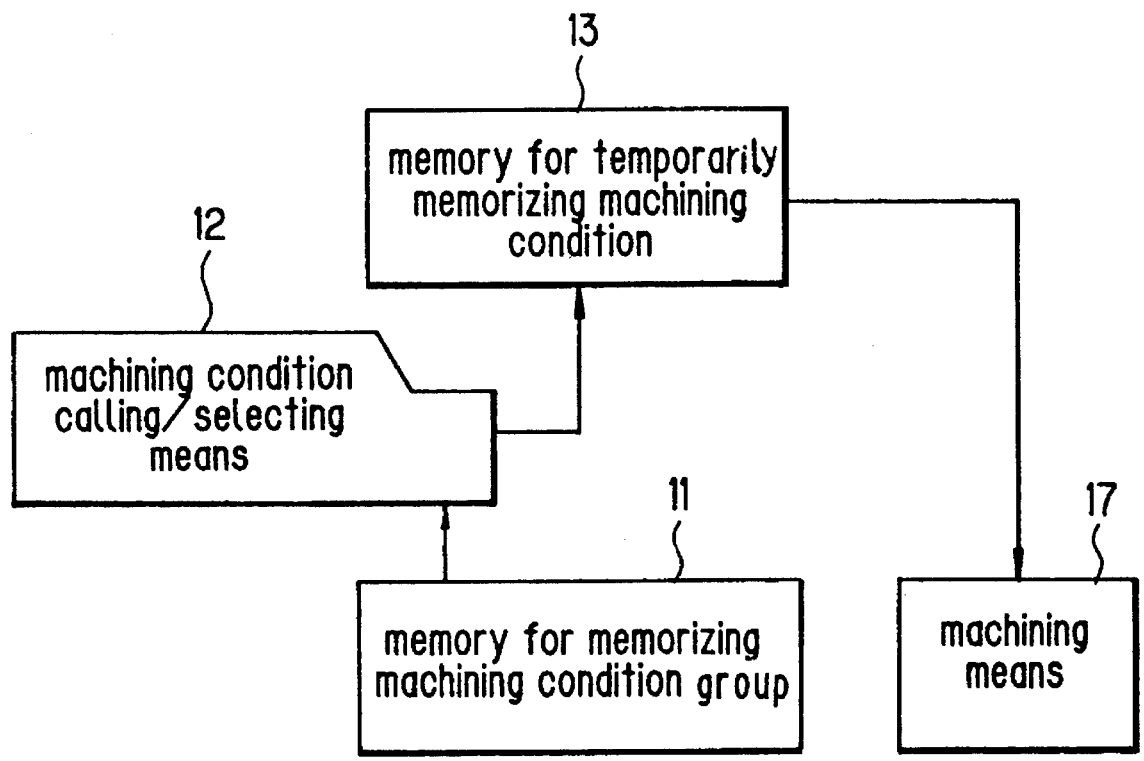
FIG. 18 is a block diagram showing structure of a machining condition setting circuit in the conventional wire electrical discharge machining apparatus.

The operation of machining using the machining condition columns thus created is described in conjunction with a flow chart in FIG. 11. A machining frequency counter is reset (step S-50). A count by the machining frequency counter is carried out (step S-51). A machining condition column number is inputted (step S-52). Machining frequency is inputted (step S-53). The electrical conditions, the offset amount, and the table moving speed are outputted (step S-54). The electrical conditions, the offset amount, and the table moving speed are set (step S-55). The machining power supply is set ON (step S-56). It is judged whether machining is so (step S-57). If finished, the next shape is machined (step S-58).

An example of creating the machining condition columns is described as follows. FIG. 12 shows an example of machining data. Each of the machining data is memorized in the machining data memorizing means 58 in accordance with machining data numbers(105–114). Each number represents a different combination of wire electrode (w), workpiece materials (m), and workpiece thickness (t). Thus, retrieval of the machining data by the machining data retrieving means 59 may be carried out according to a specified wire electrode (w), workpiece material (m), and workpiece thickness (t). The machining data retrieved is transmitted to the machining condition column creating means 60.

Various machining processes are selectively carried out by adjusting electric discharge energy according to machining orders established according to machining surface roughness. The machining rules for governing such a method comprises the selection of an appropriate level of electric discharge energy according to machining orders established for each of several choices of machining surface roughness. FIG. 13 shows an example of machining rules. The machining rules selected according to the machining surface roughness parameter (r) are transmitted to the machining condition column creating means 60.

FIG. 14 shows an example of the machining condition columns created. The machining data transmitted to the machining condition column creating means 60 is arranged in machining order(1–7) according to the machining rules set on the basis of electric discharge energy used in the machining data. An offset amount (H) is calculated using the expression described above with respect to machining orders. Thereafter, creation of the machining condition columns is finished. The machining condition columns created are transmitted to the machining condition column memorizing means 62 and are memorized in accordance with machining condition column numbers.

As explained above, according to the electrical discharge machining method and the machine therefor in the invention, by automatically retrieving machining data and automatically creating machining condition columns, machining parameters do not need to be set in the main control unit, preparation for machining can be carried out in a short time and with accuracy, and plural machining condition columns are easily created so that continuous machining can be easily carried out, even when there are many combinations of machining surface roughness and workpiece thickness, etc.

Although the invention has been described with respect to a specific embodiment for a complete and clear disclosure, the appended claims are not to be thus limited but are to be construed as embodying all modifications and alternative constructions that may occur to one skilled in the art which fairly fall within the basis teaching herein set forth.

What is claimed is:

1. An electrical discharge machining apparatus, in which machining is carried out by electric discharge between an electrode and a workpiece, the apparatus comprising:

a memory for storing a machining condition group, wherein the machining condition group represents a plurality of predetermined machining conditions used during machining of the workpiece;

a machining condition calling/selecting means for calling and selecting machining conditions from said memory from those represented by the stored machining condition group;

a switching means providing an input to a machining condition changing means, said machining condition changing means including memory means for storing a plurality of machining condition changing programs, and operating to select an appropriate one of said programs on the basis of the input from said switching means, said programs including at least a plurality of programs for changing machining conditions so as to obtain machining conditions appropriate for different workpiece configurations; and an operating means for changing the machining conditions selected by said machining condition calling/selecting means in accordance with an output of said machining condition changing means, the changed machining conditions being different from the plurality of predetermined machining conditions represented by the machining condition group stored in said memory, wherein machining of the workpiece is carried out according to the machining conditions as changed by said operating means.

2. An electrical discharge machining apparatus according to claim 1 further comprising:

a memory for temporarily storing the machining conditions called and selected by said machining condition calling/selecting means.

3. An electrical discharge machining apparatus according to claim 2, wherein the machining condition changing means comprises a memory for storing machining condition changing programs, said machining condition changing programs being responsive to said switching means in order to identify for use by said operating means which of the selected machining conditions should be changed so as to achieve at least one goal of a group of goals comprising optimizing machining speed, preventing wire-breakage, and achieving economical machining.

4. An electrical discharge machining apparatus according to claim 1, wherein said operating means is operative to change machining conditions according to the machining condition changing means and said switching means, wherein the machining condition changing means identify which of the selected machining conditions should be changed and to what degree they should be changed, so as to achieve at least one goal of a group of goals comprising optimizing machining speed, preventing wire-breakage, and achieving economical machining.

5. An electrical discharge machining apparatus according to claim 4, wherein the machining data retrieving means automatically retrieves the machining data from said machining data memorizing means by a retrieval command, said retrieval command comprising (a) retrieval factors including wire electrode characteristics, workpiece materials and workpiece thickness, and (b) machining condition column data.

6. An electrical discharge machining apparatus comprising:

machining data memorizing means for memorizing machining data, machining data retrieving means for automatically retrieving certain machining data from said machining data memorizing means according to certain parameters, machining rule memorizing means for memorizing machining rules, and machining condition column creating means for arranging in machining order the machining data retrieved by said machining data retrieving means according to the machining rules selected from said machining rule memorizing means, for automatically operating on said parameters and for creating machining condition columns.

7. An electrical discharge machining apparatus, in which machining is carried out by electric discharge between a wire electrode and a workpiece, comprising:

machining data memorizing means for memorizing machining data, machining data retrieving means for automatically retrieving certain machining data according to parameters from said machining data memorizing means, machining rule memorizing means for memorizing machining rules, and machining condition column creating means for arranging in machining order the machining data retrieved by said machining data retrieving means according to the machining rules selected according to certain parameters from said machining rule memorizing means, automatically operating on said parameters and creating machining condition columns.

8. A method of controlling an electrical discharge machining apparatus, the method comprising the steps of:

specifying certain machining parameters;

automatically retrieving machining data from a machining data storing means according to said specified parameters, selecting machining rules according to said parameters from a machining rule storing means;

arranging said retrieved machining data in a machining order according to said selected machining rules; and automatically operating on said arranged data and creating at least one machining condition, and machining on the basis of at least one created column of said machining conditions.

9. The method of claim 8, wherein said automatic retrieval of said machining data comprises automatically retrieving said machining data using (a) retrieval factors including wire electrode characteristics, workpiece materials and workpiece thickness, and (b) machining condition column data.

* * * * *